United States Patent [19]

Foster et al.

[11] Patent Number: 5,469,542

[45] Date of Patent: Nov. 21, 1995

[54] SERIAL DIAGNOSTIC INTERFACE BUS FOR MULTIPROCESSOR SYSTEMS

[75] Inventors: David J. Foster, White Plains; Armando Garcia, Yorktown Heights; Robert B. Pearson, Cold Spring, all of N.Y.

[73] Assignee: International Business Machines Corporation, Armonk, N.Y.

[21] Appl. No.: 733,767

[22] Filed: Jul. 22, 1991

[51] Int. Cl.$^6$ .............................. G06F 13/00; G06F 11/00
[52] U.S. Cl. .................. 395/200.01; 364/DIG. 1; 364/229.3; 364/265; 364/265.2; 364/267; 364/267.4; 364/284; 395/200.11; 395/200.17
[58] Field of Search ..................... 395/200, 575; 364/DIG. 2, DIG. 1

[56] References Cited

U.S. PATENT DOCUMENTS

| | | |
|---|---|---|
| 4,074,352 | 2/1978 | Cook et al. . |
| 4,312,066 | 1/1982 | Bantz et al. . |
| 4,313,162 | 1/1982 | Baun et al. . |
| 4,354,225 | 10/1982 | Frieder et al. . |
| 4,409,656 | 10/1983 | Andersen et al. . |
| 4,454,577 | 6/1984 | Costantini et al. . |
| 4,459,655 | 7/1984 | Willemin . |
| 4,468,734 | 8/1984 | Lanier et al. ........................ 364/200 |
| 4,503,535 | 3/1985 | Budde et al. . |
| 4,527,237 | 7/1985 | Frieder et al. . |
| 4,608,631 | 8/1986 | Stiffler et al. . |
| 4,641,238 | 2/1987 | Kneib . |
| 4,688,171 | 8/1987 | Selim et al. ........................ 364/200 |
| 4,701,845 | 10/1987 | Andreasen et al. . |

Primary Examiner—Kevin A. Kriess
Assistant Examiner—Kakali Chaki
Attorney, Agent, or Firm—Perman & Green

[57] ABSTRACT

Apparatus and method for use in a multiprocessor system (10) having a plurality of processing nodes (P0–P3) each of which includes a local data processor (22a, 28a). The apparatus includes an interface (42) to a controller (14), the interface including a register (48) for storing a function received from the controller, such as a diagnostic function. The interface further includes circuitry (50) for providing the diagnostic function as a packet to an input terminal of a bit serial communication bus (40). The communication bus is threaded through each of the plurality of processing nodes and has an output terminal that terminates at the interface. Each of the nodes includes a register (54) for receiving the packet and, responsive to information conveyed thereby, for halting the local data processor and for controlling the operation of local data processor control signal lines, data signal lines, and address signal lines so as to execute the diagnostic function, such as reading data from or writing data to a specified location. The local data processor may also be reset, rebooted, restarted from a halted condition, or interrupted.

15 Claims, 8 Drawing Sheets

SERIAL CLEAR STATE MACHINE

SERIAL DIAGNOSTIC INTERFACE BUS FOR MULTIPROCESSOR SYSTEMS

CROSS REFERENCE TO RELATED PATENT APPLICATIONS

This patent application is related to the following commonly assigned U.S. patent applications: Ser. No. 07/734432, filed Jul. 22, 1991, entitled "Scientific Visualization System" D Foster et al. now abandonded; Ser. No. 07/734,206, filed Jul. 22, 1991, entitled "A Universal Buffered Interface for Coupling Multiple Processors, Memory Units, and I/O Interface to a Common High-Speed Interconnect" A. Garcia, now abandonded; and Ser. NO. 07/733,517, filed Jul. 22, 1991, entitled "A Processor Buffered Interface for Multiprocessor Systems" D. Foster et al.

FIELD OF THE INVENTION

This invention relates generally to multiprocessor data processing systems and, in particular, to diagnostic and control apparatus and method implemented with a bit serial bus.

BACKGROUND OF THE INVENTION:

System requirements needed to interact with and visualize large, time-dependent data sets include a large, high-bandwidth disk array to store the entire data set being processed, a high speed network to download a problem set, a large, high-speed memory to buffer all data required to process a single simulation time step, computational power that is adequate to manipulate, enhance, and visualize the data sets, and a real-time, high resolution visual display. Furthermore, it is important that these functions be provided within a highly programmable and flexible user environment.

To realize such large and complex systems a multiprocessor approach may be taken, wherein a plurality of data processors operate in parallel on the same aspect or on different aspects of a processing task.

However, one problem that is encountered in multiprocessor systems is the implementation of diagnostic and control circuitry for the plurality of processors. In this regard, it is known in the art to provide a diagnostic bus, which may be bit serial in nature, that is independent of other system buses. Through the use of the diagnostic bus an external device is enabled to read out system information and to stimulate system components to perform operational diagnostics.

The following U.S. Patents teach aspects of conventional data processing system diagnostic circuitry and/or the use of a bit serial bus for communicating between various system components.

In U.S. Pat. No. 4,409,656, issued Oct. 11, 1983, entitled "Serial Data Bus Communication System" to Andersen et al. there is described a serial data bus architecture for use in a system having a plurality of user computers. The serial data bus functions to permit two-way, point-to-point communication between any pair of user computers or, alternatively, to permit any one user computer to broadcast simultaneously to all other users in the system, via a central bus arbiter. A two wire serial channel is employed, with one wire for control and one for data. Multiple redundancy is also provided so that there are several possible serial paths between any two end points.

U.S. Pat. No. 4,527,237, issued Jul. 2, 1985, entitled "Data Processing System" to Frieder et al. shows in FIG. 14 a remote diagnostic interface and a console interface, both of which are connected to dual serial channels. The system also includes a diagnostic bus interface connected to a diagnostic bus.

In U.S. Pat. No. 4,701,845, issued Oct. 20, 1987, entitled "User Interface Processor for Computer Network with Maintenance and Programmable Interrupt Capability" to Andreasen et al. there is described a user interface processor that supports a computer system network having a central processing unit connected to remote peripherals through data link processors. The user interface processor, or maintenance processor, connects to a central host processing unit through a processor interface card which attaches directly to the host system bus.

In commonly assigned U.S. Pat. No. 4,312,066, issued Jan. 19, 1982, entitled "Diagnostic/Debug Machine Architecture" to Bantz et al. there is described a diagnostic and debugging facility said to be specifically designed and intended for use with a host computer embodying a Level Sensitive Scan Design (LSSD) concept. As disclosed in Col. 5, lines 45–60, the LSSD provides a shift-register capability to every logic system latch in a processing unit and organizes the shift-register latches into one or more shift-register data channels having terminal stages accessible via an interface.

What is not taught by these U.S. Patents, and what is thus one object of the invention to provide, is a single wire bit serial diagnostic bus for use by a Serial Diagnostic Interface (SDI) master in issuing information packets to SDI slaves.

A further object of the invention is to provide method and apparatus for use in a multiprocessor system for enabling one or more processors to be halted, a local memory of each of the processors to be modified, and the processors restarted.

A further object of the invention is to provide at each node of a multiprocessor system a diagnostic interface including registers and a controller coupled to a diagnostic bus for receiving diagnostic functions therefrom and for executing the functions, the functions enabling a local processor to be halted and its functionality simulated by the diagnostic interface.

SUMMARY OF THE INVENTION

The foregoing and other problems are overcome and the objects of the invention are realized by a serial diagnostic interface bus architecture implemented in a multiprocessor system. A serial bus master performs control functions on a selective or a broadcast basis and, in addition, may perform any bus function at a particular processor node by mimicking the operation of the node's processor. The serial bus is protected against bus errors, and serial controllers ensure correct alignment at a start of an information packet. In addition, operation of the serial bus is not delayed by a unit servicing a packet, as is often the case with many conventional packet-based schemes.

More specifically, the invention provides apparatus, and a method of operating same, for use in a multiprocessor system having a plurality of processing nodes, each of which includes a local data processor. The apparatus includes an interface to a controller, such as a diagnostic controller, the interface including a register for storing a diagnostic function received from the diagnostic controller. The interface further includes circuitry for providing the diagnostic function as a packet to an input terminal of a bit serial communication bus. The communication bus is threaded through each of the plurality of processing nodes and has an output terminal that terminates at the interface. Each of the nodes includes a register for receiving the packet and, responsive to information conveyed thereby, for halting the local data processor and for controlling the operation of local data processor control signal lines, data signal lines, and address signal lines so as to execute the diagnostic function.

The packet is comprised of a plurality of bits partitioned into a plurality of fields. The fields include: a DATA field for expressing data to be written to or data read from a specified address location; an ADDRESS field for specifying the address location; a SOURCE field for specifying an identification of a sender of the packet; a DESTINATION field for specifying an identification of an intended recipient of the packet; and an OPCODE field for specifying the diagnostic function to be performed by the recipient of the packet.

The packet fields further include: a START field for identifying the beginning of the packet; a FULL flag for indicating that the packet contains valid data in the DATA field, the ADDRESS field, etc.; a LRC data integrity field for indicating the data integrity of the packet; an ACK flag to indicate that a processor node has received the packet; and a NAK flag to indicate that a processor node has received the packet but is not able to accept the packet for execution.

The diagnostic functions include: reading data from a specified address; writing specified data to a specified address; resetting the local data processor; halting the local data processor; restarting a halted local data processor; interrupting the local data processor; and rebooting the local data processor.

BRIEF DESCRIPTION OF THE DRAWING

The above set forth and other features of the invention are made more apparent in the ensuing Detailed Description of the Invention when read in conjunction with the attached Drawing, wherein:

FIG. 8b is a diagram of a State machine illustrated in FIG. 8a.

DETAILED DESCRIPTION OF THE INVENTION

Figure 1:
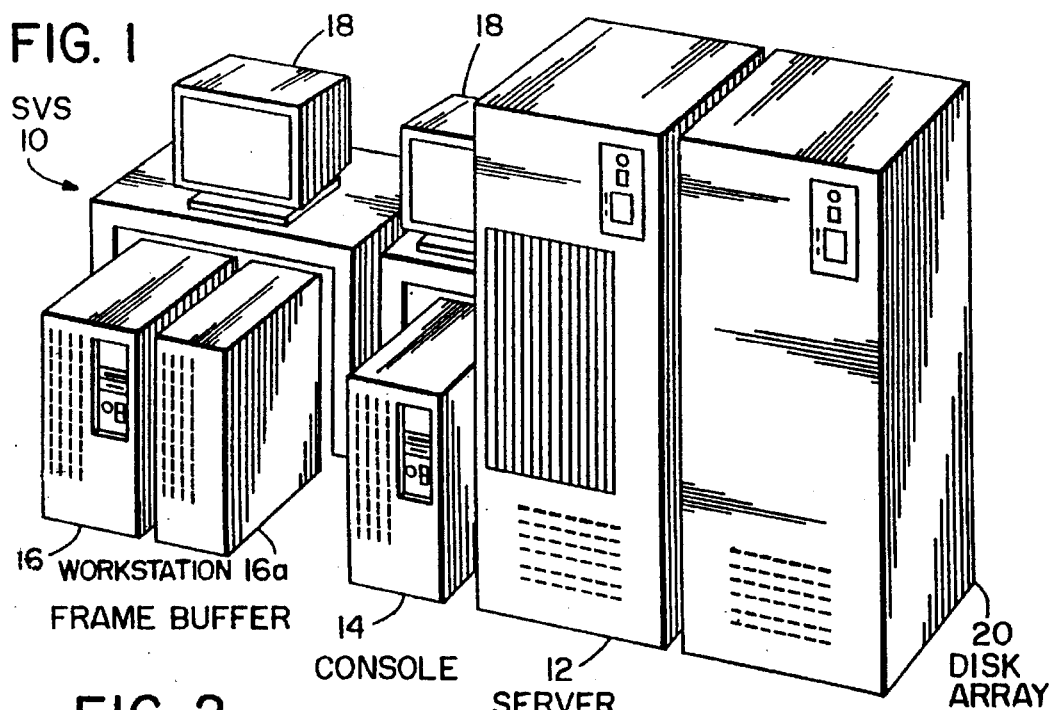
FIG. 1 illustrates system components of a scientific visualization system.

Referring to FIG. 1 there is illustrated a multiprocessor system that includes a serial diagnostic bus and controller that is constructed and operated in accordance with the invention. Specifically, there are illustrated components of a Scientific Visualization System (SVS) 10. A purpose of the SVS 10 is to process, manipulate, and visualize complex data sets at interactive speeds, although the use of the system 10 is not limited to only this one important application. Furthermore, and as will become apparent, the use of the serial diagnostic bus and controller is not restricted to only this particular system. That is, the serial diagnostic bus and controller as taught by the invention may be employed to advantage in a number of different types of multiprocessor systems.

The SVS 10 includes several major components. A first component is a server 12 embodied within a data processing system that provides large-scale computational power, high-speed memory, and intelligent I/O processors, all of which are interconnected by a high speed global bus. The terms global bus, shared bus, and common interconnect are used interchangeably herein.

A second component is a console 14 embodied in, by example, a RISC System/6000 POWERstation/POWERserver 530 manufactured by the International Business Machines Corporation (RISC System/6000 is a Trademark of the International Business Machines Corporation). The console 14 provides network access from remote workstations (not shown) and interfaces with the serial diagnostic controller of the invention in a manner described below.

A third component is a Frame buffer 16, also embodied in, by example, a RS/6000 workstation. Frame buffer 16 includes interface and image buffering hardware 16a attached via an ANSI standard High Performance Parallel Interface (HIPPI) interface for providing real-time display capability to high-resolution displays 18. A further component of the system 10 is a disk array 20. The disk array 20 may be embodied within a storage system having 21 GByte capacity with 55 MByte/second transfer rate, via a High Performance Parallel Interface (HPPI).

It should be realized that the exact configuration of the system 10 varies depending on the intended use and that the configuration of FIG. 1 is not intended to represent a limitation upon the practice of the invention.

Figure 2:
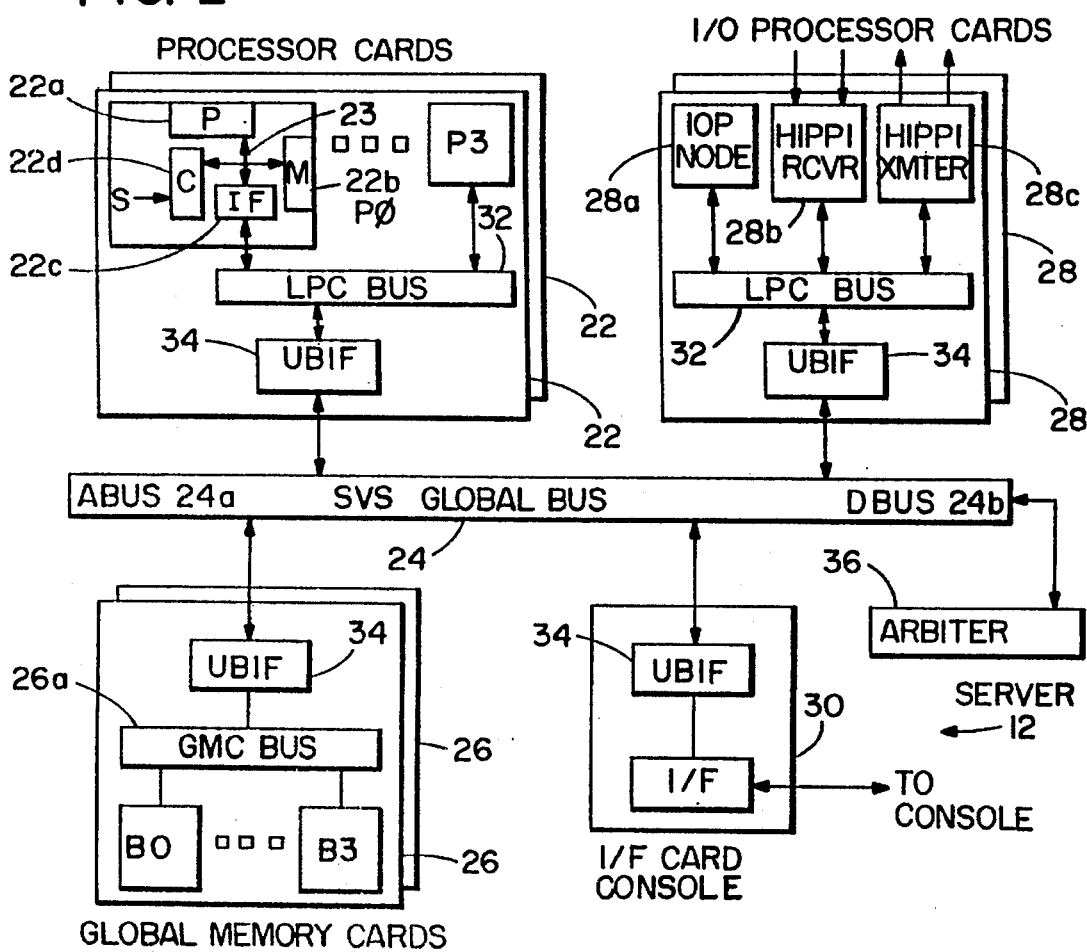
FIG. 2 is a block diagram of the system server component of FIG. 1.

Referring to FIG. 2 there is illustrated in block diagram form the server 12 of the SVS 10. Server 12 is comprised of a plurality of individual processors 22a organized as four processors (P0–P3) per printed circuit card 22. The server 12 may include up to eight cards for a total of 32 processors. Each processor card 22 includes a universal bus interface (UBIF) 34 for coupling a Local Processor Card (LPC) bus 32 to a SVS global bus 24. Also coupled to the SVS global bus 24 are a plurality of Global Memory cards 26, a plurality of I/O processor cards 28, and an interface 30 to the RS/6000 console 14.

More specifically, each processor card 22 includes up to four processor nodes each having a microprocessor 22a. In a present embodiment each microprocessor 22a is an i860-type 80860 microprocessor device manufactured by Intel Corporation. Coupled to each microprocessor 22a through a node bus 23 is a local node memory 22b providing, in this embodiment, 16 megabytes (MB) of storage. Each processor node also includes a buffered interface 22c to the LPC bus 32. Additionally, each processor node includes an interface 22d to a serial bus (S). The LPC bus 32 connects multiple processor nodes to the UBIF 34 and also permits access to further shared resources.

In a present embodiment one of the processor cards 22 is capable of a peak performance of 160 million instructions per second (MIPS), or 320 million single precision floating point operations per second (MFLOPS). A fully configured system of eight processor cards 22 provides a peak performance approaching 1.28 billion instructions per second (BIPS) or 2.56 GFLOPS, assuming 40 MHz operation.

In a present embodiment each of the Global Memory cards 26 is configured with either 128 MB or 256 MB of random access memory with ECC. The server 12 may include up to four Global Memory cards 26. Each of the Global Memory cards 26 provides a data bandwidth of 640 MB/second in a manner that reduces a memory access latency seen by each user of the system 10. This is accomplished by partitioning the Global Memory on each memory card 26 into four memory banks (B0–B3), each of which is capable of independently performing block read cycles, page mode read or write cycles and random read or write cycles. A Global Memory Card (GMC) bus 26a enables each of the banks (B0–B3) to operate independently, while utilizing common global bus resources.

The I/O processor cards 28 each include a processor node 28a, similar to processor node 22a of the processor card 22, in addition to two HIPPI receivers 28b, and two HIPPI transmitters 28C. Each IOP 28 provides four HIPPI interfaces, each of which is capable of operation at a transfer rate of 100 MB/second. The channels may operate independently to deliver 100 Mbytes/second each, or in a paired manner to deliver 200 Mbytes/second. The HIPPI interfaces are employed to support high speed disk arrays, provide real-time images to HIPPI-attached frame buffers, and realize high speed communication with external devices, such as supercomputers.

The RS/6000 Console interface 30 is partitioned into two cards, one which is found within the server 12 and one which resides in the RS/6000 console 14. The link between the two card allows access to the Global memory 26 and serial bus, which in turn allows access to each processor's local memory and PBIF.

The system 10 also includes an Arbiter 36 that is coupled to the Global Bus 24 and which operates to arbitrate requests for the Global Bus between the processors 22, the memory 26, and the I/O processors 28.

The Global Bus 24 is implemented with Emitter Coupled Logic (ECL) technology for interconnecting these various components and providing a 1.28 GByte/sec transfer rate. Major signal groups of the Global Bus 24 include a 32-bit address bus (ABUS) 24a, a 256-bit data bus (DBUS) 24b, and a control bus.

Each SVS 10 server 12 supports up to 12 master devices (i.e. processor cards 22, I/O processor cards 28, or RS/6000 Interface card), and up to four memory cards 26. One possible configuration includes an RS/6000 Interface card 30, eight processor cards 22 (or 32 processors), four Global Memory cards 26 each with 256 MBytes of storage for a total of 1024 MB of high speed memory, and one I/O processor 28 to support the high speed disk array 20, receive data from a HIPPI source, and distribute image data to HIPPI attached frame buffers 16. The RS/6000 console workstation 14 provides a user interface to the SVS 10 as well as support for standard I/O devices.

As can be seen in FIG. 2 each component card of the system 10 includes one of the UBIFs 34. The UBIF 34 presents a shared, synchronous, decoupled interface to the Global Bus 24, provides local arbitration on the LPC bus 32 or GMC bus 26a, and performs all necessary handshaking and retry sequencing with the Global bus 24. In a present embodiment the UBIF 34 provides bidirectional, pipelined buffering to support up to four local master devices, such as processors 22a, or up to four slave devices, such as the memory banks B0–B3. The UBIF 34 supports data bus widths between eight bits and 256 bits and provides a peak data transfer rate of 1.28 Gbytes/second between the Local Bus 32 and the Global Bus 24, assuming 40 MHz bus operation (25 nanosecond bus cycle).

Figure 3:
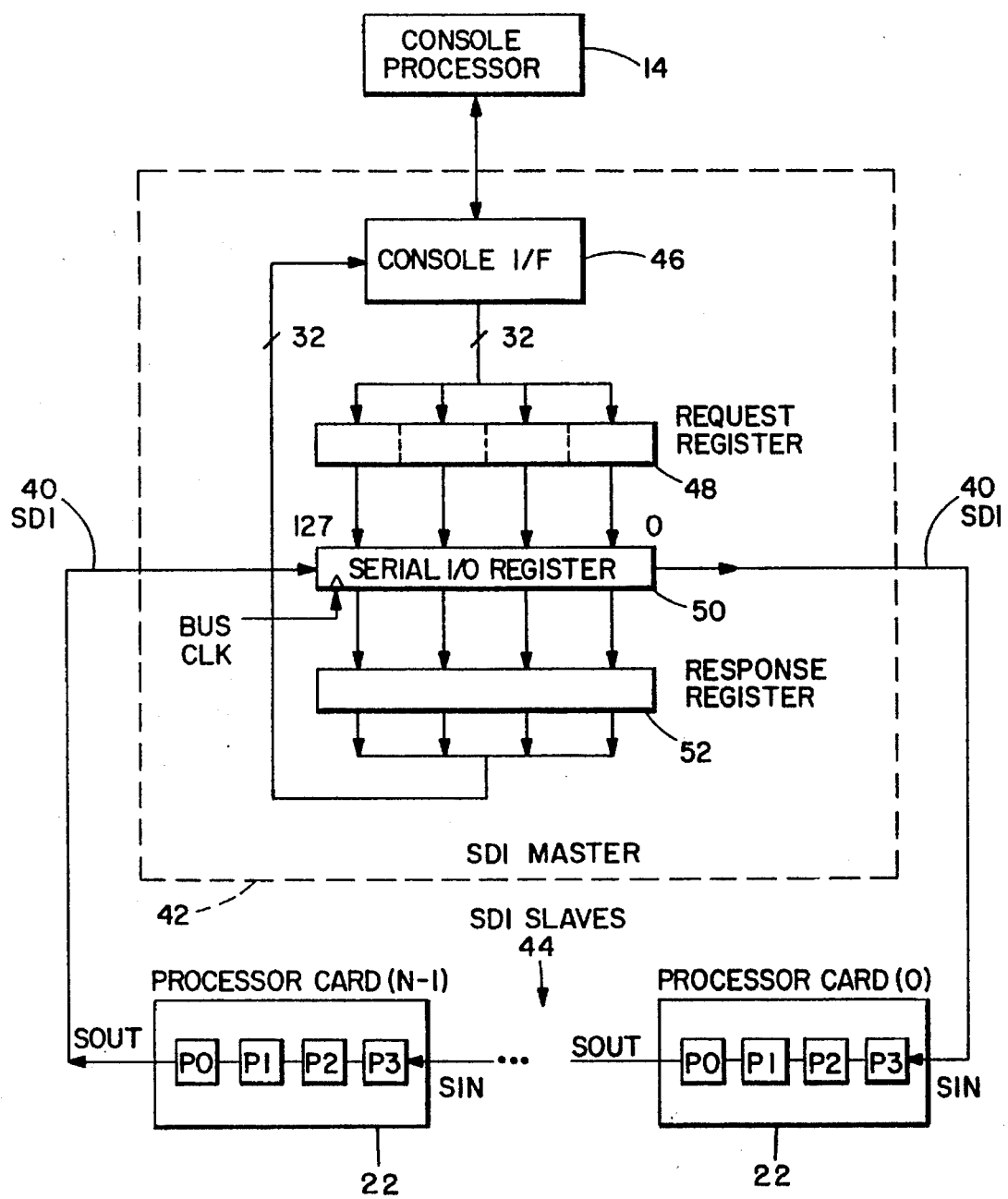
FIG. 3 is a simplified block diagram depicting the serial architecture of the system of FIGS. 1 and 2.
Figure 5:
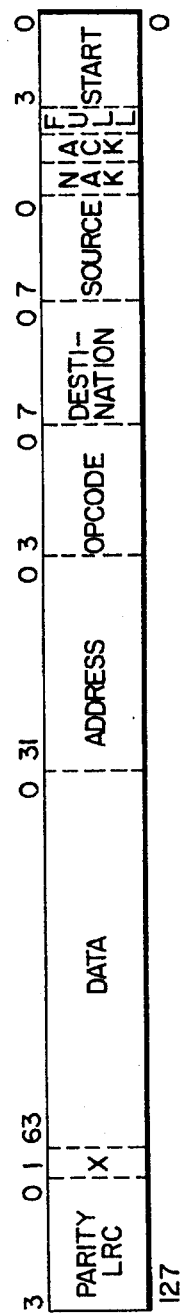
FIG. 5 shows a presently preferred embodiment of a serial diagnostic bus information packet.

Referring to the block diagram of FIG. 3 there is now described a presently preferred embodiment of a serial diagnostic bus and controller that is employed in the SVS 10 to provide diagnostic and initialization bootstrapping support. A Serial Diagnostic Interface (SDI) bus 40 has one SDI master 42, and a number of SDI slaves 44, where each SDI slave is typically one of the processor nodes (P0–P3) of the processor cards 22. All SDI information packets, having a format as illustrated in FIG. 5, are originated from the SDI master 42, are processed, in turn, by each of the SDI slaves 44, and are subsequently returned to the SDI master 42. The SDI master 42 communicates to the host or console processor 14 through an interface card 46.

The SDI bus 40 is implemented as a signal line that is threaded through all of the processor nodes in the SVS 10, and which transfers data in a bit serial format synchronously with the system clock. For a presently preferred embodiment the system clock operates at 40 MHz.

In operation, the console processor 14 composes an outgoing SDI packet and stores same, via interface card 46, within a request register 48. The content of the request register 48 is parallel loaded into a serial I/O register 50 and shifted out in bit serial format over the SDI bus 40 to the SDI slaves 44. The packet is eventually returned to the SDI Master 42 where it is accumulated and stored within a response register 52. The returned packet may be read by the console processor 14 from the response register 52, via the interface card 46, without disrupting the data flow through the SDI bus 40.

Figure 4A:
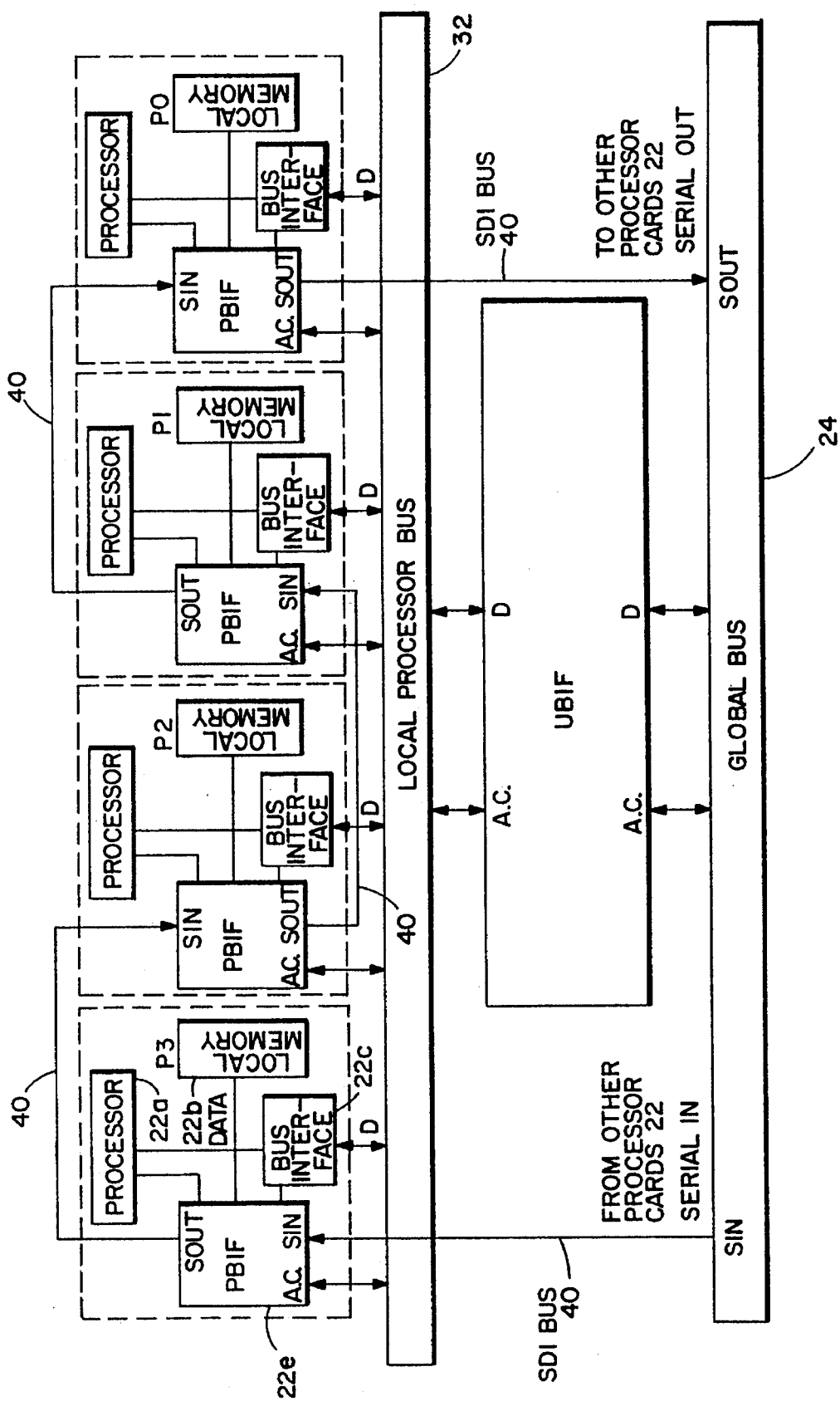
FIG. 4a is a simplified block diagram showing in greater detail the processor cards of FIG. 2 and also the coupling of the serial diagnostic bus between processor cards.

As was noted previously, each processor card 22 in the SVS 10 system includes four processor nodes, all of which are considered to be SDI slaves 44. One of the SVS 10 processor cards 22 is illustrated in FIG. 4a. The incoming SDI bus 40 is sourced from a Global Bus 24 Serial Input (SIN) signal line and is applied to the processor node P3. From P3 the serial bus is coupled in turn to P2, P1, and P0. From P0 the SDI bus 40 is coupled to a Serial Output (SOUT) line of the Global Bus 24 and is coupled to the SIN terminal of a next system processor card 22.

Each processor node contains the beforementioned interface circuitry 22d which is implemented, in a presently preferred embodiment of the invention, within an Application Specific Integrated Circuit (ASIC), referred to herein as a Processor Buffered Interface (PBIF) 22e. The PBIF 22e performs all of the interface logic for the processor node, and also implements the serial bus protocol. The PBIF 22e is described in copending and commonly assigned U.S. patent application Ser. No. 07/733,517, filed Jul. 22, 1991, entitled "A Processor Buffered Interface for Multiprocessor Systems" by D. J. Foster and A. Garcia. Aspects of the PBIF 22e that are particularly relevant to the teaching of the invention are described below and illustrated in FIG. 6.

Figure 4B:
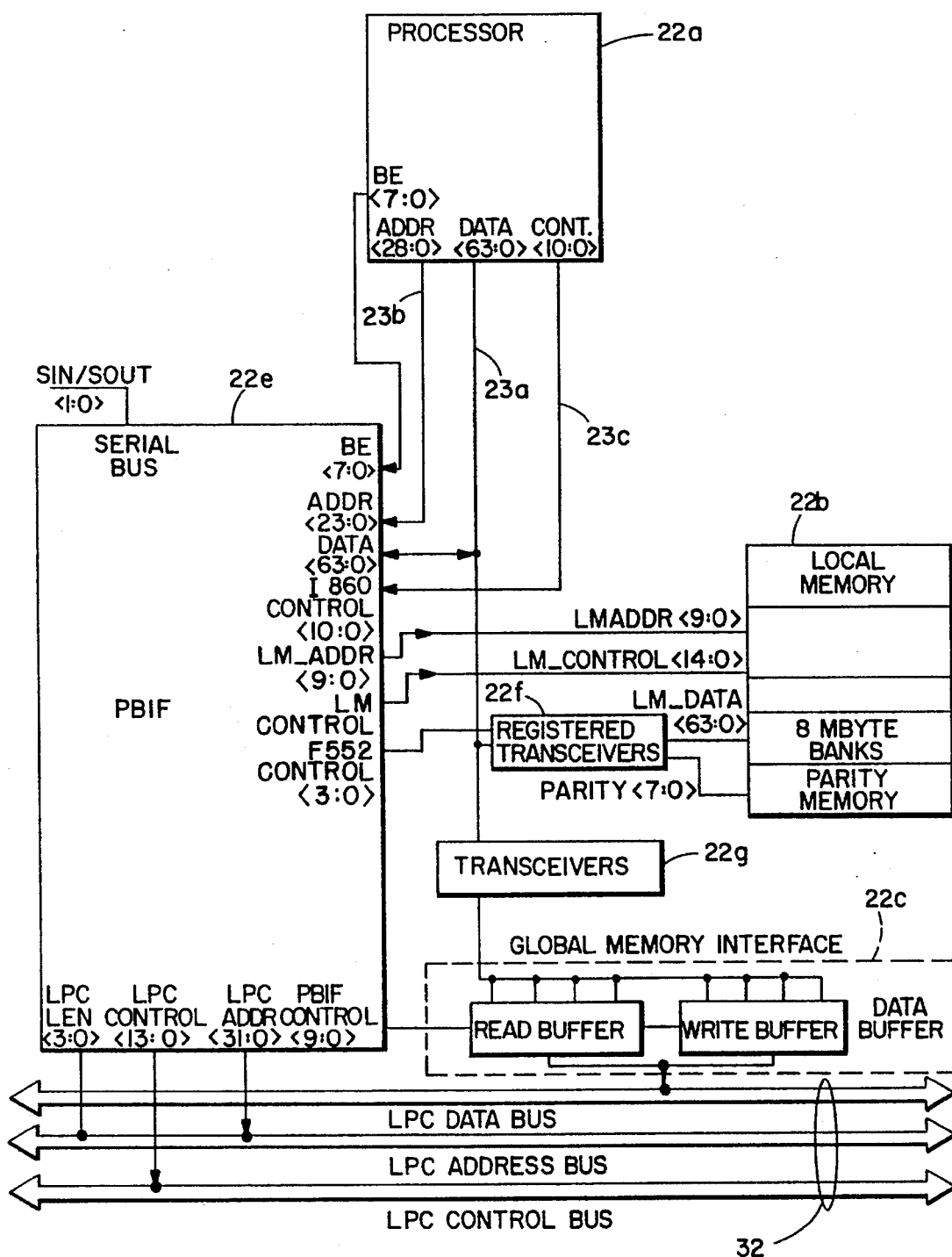
FIG. 4b is a block diagram depicting in greater detail the coupling of the node processor to the address, data, and control lines generated by the serial interface.

FIG. 4b shows in greater detail the interconnection, within a local processor node, of the PBIF 22e to the local processor 22a (or 28a), the local memory 22b, the global memory interface 22c, and the LPC bus 32. As can be seen, the local memory 22b is partitioned into 8 Mbyte banks and also includes a parity memory section for storing parity memory information associated with each of the memory banks. A set of eight registered transceivers 22f is employed for bidirectionally interfacing the local memory banks and parity memory to the local node 64-bit data bus 23a. A set of eight transceivers 22g bidirectionally couple the local node data bus 23a to the read and write buffers of a global memory interface 22h.

Figure 6:
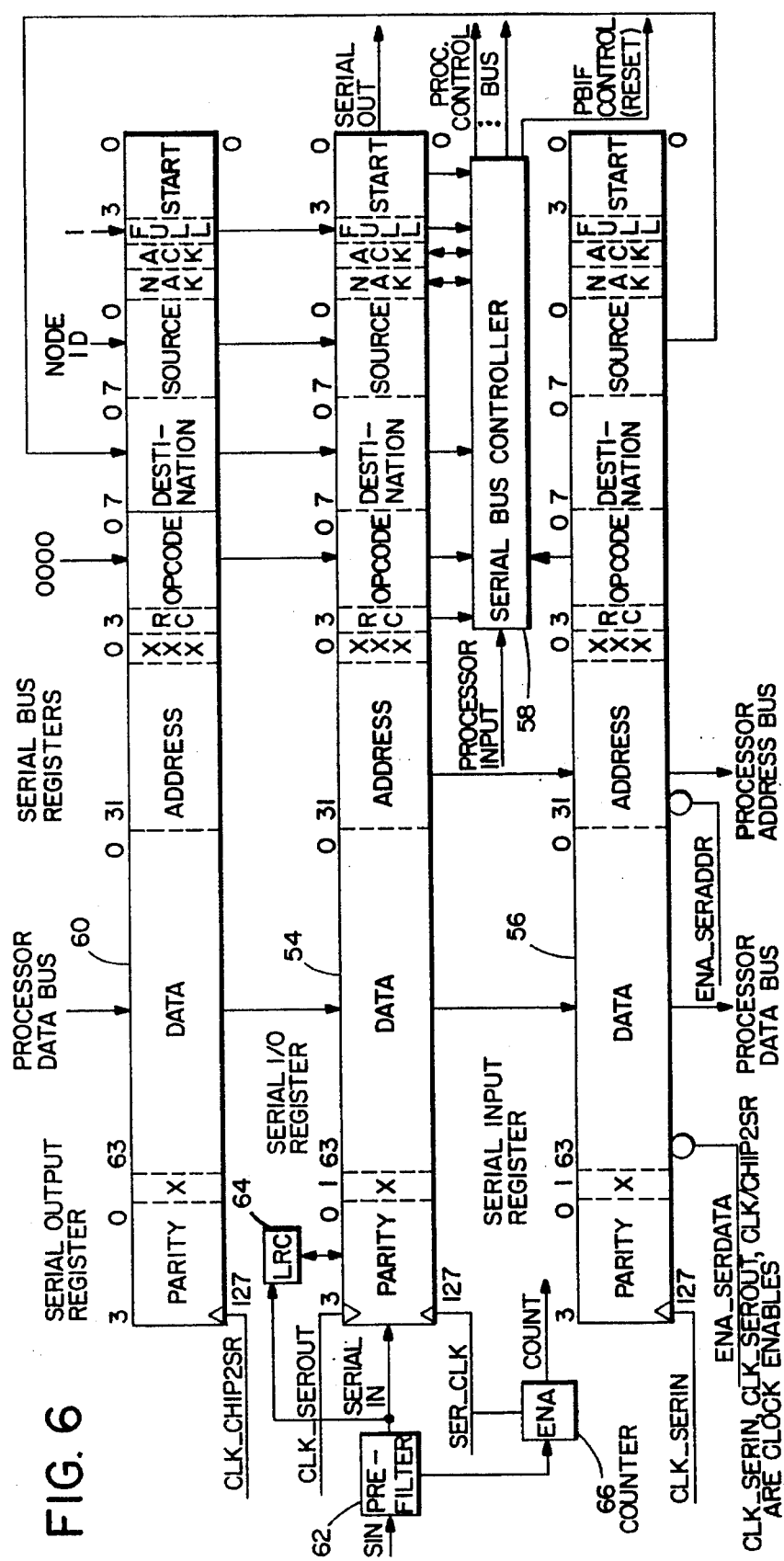
FIG. 6 is a block diagram showing registers employed with the serial diagnostic bus.

As can be seen, the PBIF 22e, containing the serial bus registers shown in FIG. 6, is coupled to the Serial In and Serial Out signal lines. The PBIF 22e receives the processor address 23b and control 23c signal lines and provides addresses and controls to the local memory 22b and to the LPC bus 32. The node data bus 23a is bidirectionally coupled to the processor 22a and to the PBIF 22e.

A serial bus protocol of the invention implements the following functions.

READ WORD. This function enables the SDI master 42 to read any word. where a word is considered to be 64-bits in width, that is accessible from a given processor node of the SVC 10 system. This may be a word in Global Memory 26, a word in a processor node local memory 22b, or a word from an internal register off the PBIF 22e associated with the processor node.

WRITE WORD. This function is similar to the function READ WORD, in that it writes a 64-bit word to any location that a SDI slave 44 is capable of accessing, including the local memory 22b.

REBOOT PROCESSOR. This function enables the SDI master 42 to selectively reboot any processor in the system 10. The operation of the PBIF 22e is not affected by this instruction, but the attached processor 22a is restarted from an initial condition.

HALT PROCESSOR. This function causes a Hold Request to be made to the processor 22a at the identified processor node. The Hold Request, when acknowledged by the processor 22a, causes the processor to stop operation and place all of its output lines into a high impedance state. While the processor 22a is halted the SDI master 42 may send diagnostic function packets to the associated PBIF 22e, the packets being executed by the PBIF 22e regardless of the state of the attached processor 22a.

CONTINUE PROCESSOR. This function causes the processor 22 to continue after a HALT PROCESSOR function is executed. Program execution resumes from the point at which the processor 22a was halted.

INTERRUPT PROCESSOR. This function enables the SDI master 42 to send an interrupt to any processor 22a in the system 10. The interrupted processor 22a may determine from a PBIF 22e register that the interrupt originated from the SDI master 42.

RESET NODE. This function resets both the processor 22a and the PBIF 22e at any SDI slave 44 location. This execution of this function also resets all internal states within the PBIF 22e.

All of the above functions may be applied selectively to any processor node in the multiprocessor SVS 10. In addition, all of the functions, with the exception of the READ WORD function, may be broadcast with one command to all of the processor nodes in the SVS 10. Thus, the same function may be executed by all of the SDI slaves 42. This facility allows the local memory 22b of all processors 22a in the SVS 10 to be written with data before the system is started. This latter functionality may be achieved by issuing, for example, a HALT PROCESSOR function followed by a plurality of WRITE WORD functions.

With the exception of the console processor interface card 46, the serial bus functionality is implemented within the SVS 10 system by the PBIF 22e, which also provides local memory 22b and Global Memory 26 interface control for each processor 22a. The PBIF 22e also implements certain register/timer functions.

As shown in FIG. 5, each serial bus packet is 128-bits in length, and includes a 64-bit DATA field and a 32-bit ADDRESS field. In addition, two eight-bit fields define the identity of the sender (the SOURCE field) and the identity of an intended recipient of the packet (the DESTINATION field). A four-bit OPCODE field defines which of the above described functions is to be executed by the identified recipient, with the most significant OPCODE bit being used to signify a local function, intended for one processor node, or a broadcast function, intended for all processor nodes. A four-bit START field indicates the start of the serial bus packet. A FULL flag indicates, when set, that one or more of the packet fields contain valid data.

A modified four-bit LRC (Longitudinal Redundancy Code) is used to check for the correctness of transmitted packets. In addition, each packet has an ACKnowledge (ACK) flag, which is set by a recipient to acknowledge receipt of a packet, and a No AcKnowledge (NAK) flag, which is set if a recipient receives a valid packet but is not able to accept the packet, typically because the recipient is servicing a previously received packet. Thus, the sender of the packet is enabled to determine if (a) the intended recipient for a packet is present, and (B) if the packet is required to be re-sent.

Referring to FIG. 6 there are illustrated serial bus registers that are included within each of the PBIFs 22e. The Serial I/O Register 54 of the first processor node (P3) has an input coupled to the SIN signal line of the Global Bus 24 and is clocked by a SER_CLK signal. The SER_CLK SIGNAL shifts a packet into the Serial I/O Register 54 and also out to the SOUT signal line for reception by another PBIF 22e or, if the PBIF 22e is associated with a terminal processor node of the serial chain, to the serial I/O register 52 of the SDI master 42. That is, the SIN and SOUT signal lines are daisy-chained, with SOUT being coupled to SIN of the next processor node of the same processor card or a next processor card.

The Serial I/O Register 54 is a 128-bit register that is partitioned into fields that correspond to the packet format illustrated in FIG. 5, as are the next two registers to be described.

A Serial Input Register 56 is parallel loaded, on an edge of a CLK_SERIN signal, from the Serial I/O register 54 when the latter receives 128 bits corresponding to a complete packet, and when certain other conditions, described in detail below, are satisfied. Briefly, these conditions include a condition wherein the DESTINATION field, or the local/broadcast bit, indicates to a Serial Bus Controller 58 that the packet is intended for the associated processor node. The signals ENB_SERDATA and ENA_SEPADDR are also generated by serial state machine only after receipt of a hold-acknowledge signal from local processor 22a for coupling the contents of the Serial Input Register 56 DATA and ADDRESS fields to the processor node data and address buses, respectively.

A Serial Output Register 60 is also provided, the content of which is parallel loaded into the Serial I/O Register 54 on an edge of a CLK_SEROUT. A data field of the Serial Output Register 60 is coupled to the processor node data bus for receiving 64 bits of data therefrom during, for example, the execution of the READ WORD function.

One aspect of the invention is that the circulating packet is not delayed as it progresses through the PBIF devices of the various processor nodes of the computational processors 22a and the I/O processors 28a. That is, the packet is continuously clocked from one Serial I/O Register 54 to the next. If the packet is determined to be intended for reception by a particular one of the nodes, the packet is transferred within one clock cycle to the Serial Input Register 56, and on the clock cycle following the clock cycle that clocked in the last bit (the 128th-bit) from the SIN terminal, the first bit of the packet is clocked out of the SOUT terminal.

The Serial I/O register 54 is slightly longer than 128 bits in this implementation due to the pre-filters 62 and also because of an additional few bits appended at the end. It should be noted however that the Serial I/O register 54 is continually clocked, and thus is never delayed. As a result, a packet always appears at Sout a fixed time after entering Sin.

For a packet returned from a processor node in response to, for example, the READ WORD function, the OPCODE field of the Serial Output Register is loaded with 0000 to indicate a Return, the SOURCE field is loaded with a hardwired ID of the processor node, and the DESTINATION field is loaded from the SOURCE field of the Serial Input Register 56 for routing the modified packet back to the sender. In addition, the FULL flag is set to a one to indicate reception of the packet.

The Serial Bus Controller 58 (see FIG. 7 for state diagram) generates processor 22a control signals, including signals coupled to the processor reset and halt inputs, and control signals for mimicking local processor-generated control signals, such as read/write. Responsive to the decoded OPCODE field of the packet the Serial Bus Controller 58 controls the processor node and interfaces, if required by the OPCODE, with local or global system resources. The Serial Bus Controller 58 thus "mimics" the operation of the local processor in so far as other components coupled either directly or indirectly to the processor are concerned.

By example, the READ WORD function is employed to read data as specified by the packet ADDRESS field, the address being in the local memory 22b, the Global Memory 26, or any other system location that is normally addressable by the local processor 22a or 28a. Similarly, the WRITE WORD function is employed to write the data contained within the packet DATA field at an address specified by the packet ADDRESS field, the address being in the local memory 22b, the Global Memory 26, or any other system location that is normally addressable by the local processor 22a or 28a.

Serial bus 40 requests for processor resets, interrupts, and so forth, cause the PBIF 22e to take, via the Serial Bus Controller 58, the appropriate action. For read and write functions the PBIF 22e first requests the associated processor 22a to Halt, which, when acknowledged by the processor, indicates that the processor has placed all of its output lines in the high impedance state. By driving the address, and if need be data fields, onto the local processor bus 23, and by mimicking the operation of the processor 22a control lines, the PBIF 22e performs any read/write operation which the processor 22a can perform.

During the operation of the READ WORD function, the returned data is latched into the DATA field of the Serial Output Register 60. This may not occur for some indeterminate period of time, especially if the required data must be fetched from the Global Memory 26. To accommodate the later return of the requested data the originator of the READ WORD function request also transmits an empty packet on the serial bus 40, the empty packet being designated as so by not having the FULL bit set. After the recipient has the required data stored in the DATA field of the Serial Output Register 60, the recipient waits for an empty packet to arrive and, when it does so, the recipient clocks the data from the Serial Output Register 60 to the Serial I/O Register 54. These two registers are skewed relative to one other by one bit, to allow a full clock cycle for the Serial Bus Controller 58 to decode the packet information.

The PBIF 22e at each processor node monitors the incoming serial bus 40 and filters out noise on the serial bus. Reference is made to the schematic diagram of FIG. 8a and to the corresponding State Machine diagram of FIG. 8b. In that each valid serial packet begins with four start bits, a pre-filter 62 in each PBIF 22e operates to detect the occurrence of these four START bits. If four bits are detected as incoming sequentially, then these bits and the next 124 bits are passed into the Serial I/O Register 54. If either one, two or three bits only are detected as incoming, followed by an invalid START bit, these bits are filtered out, or removed, from the serial stream. Thus, random bits that tend to circulate in an idle bus are eliminated. The pre-filter 62 is used to ensure that correct parity is checked.

Figure 8A:
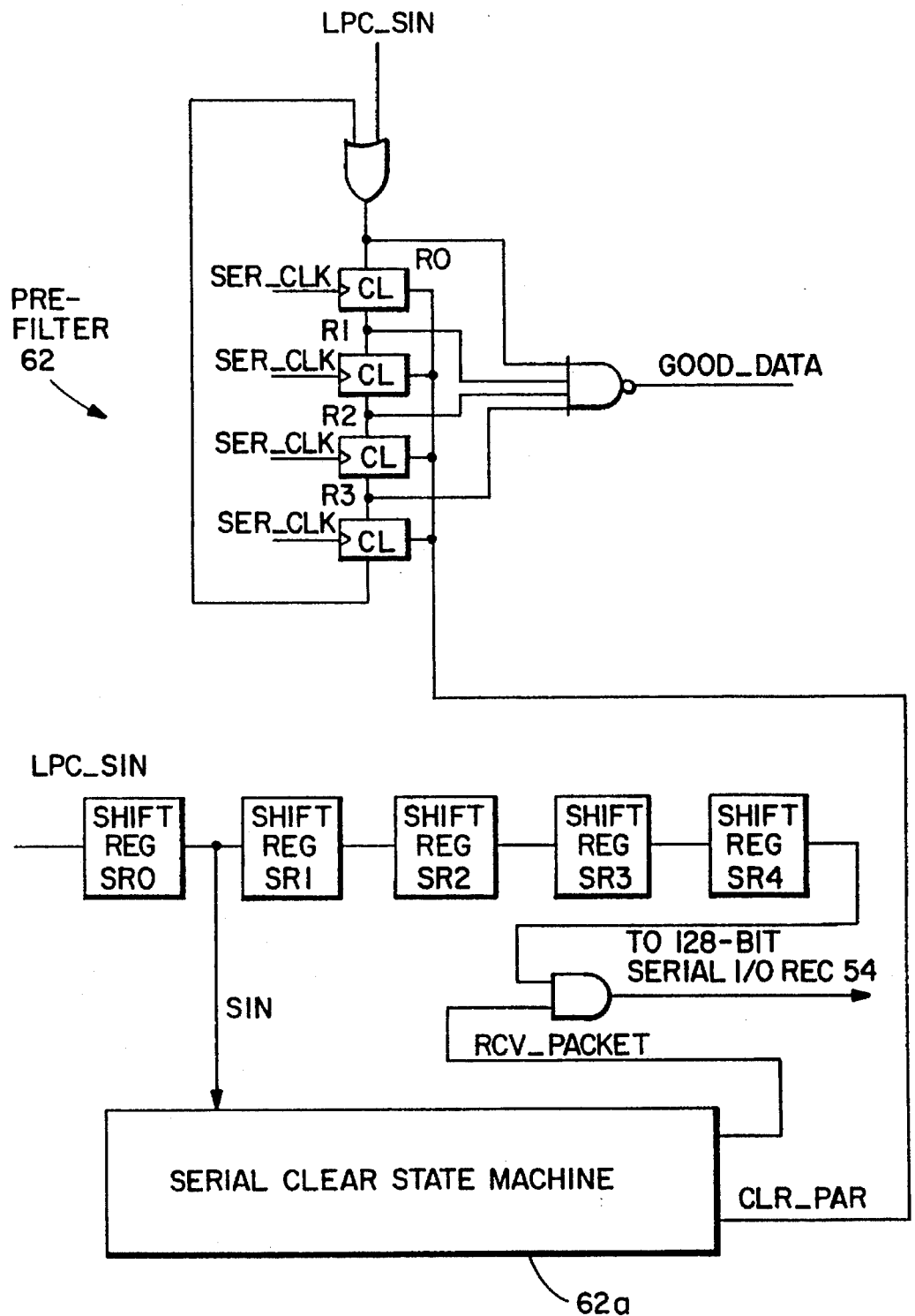
FIG. 8a is a schematic diagram of a serial input pre-filter.
Figure 8B:
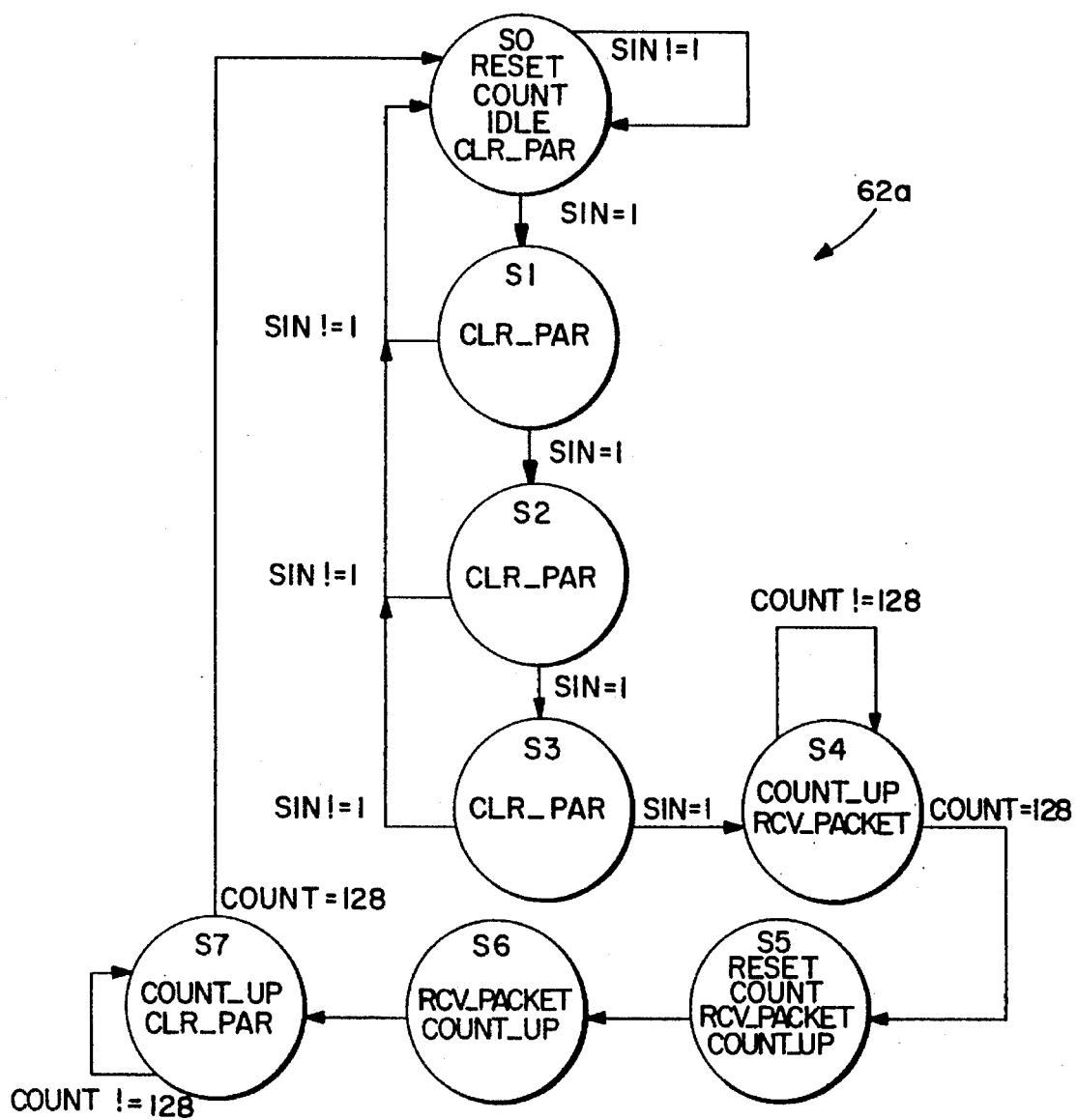

As seen in FIG. 8a the pre-filter 62 includes five serial registers (SR0–SR4), connected between the SIN pin of the PBIF 22e and the 128-bit long Serial I/O Register 54. Serial data propagates through these five registers, before being gated with RCV_PACKET output by the Serial Clear State Machine 62a (FIG. 8b). The first bit stored in this 5-bit chain is passed to the Serial Clear State Machine 62a, whose function it is to identify a start of packet field. Whilst in an idle state, a CLR_PAR output from the Clear Serial State Machine 62a clears the contents of four registers (R0–R3) used for parity checking, ensuring that the next packet received is correctly parity checked. When a "one" on the serial bus is detected, the Serial Clear State Machine 62a advances one state. It continues to advance towards state S4 if another three ones (the start of packet field) are detected in sequence. If at any time during this period a zero is detected, a branch is taken back to the idle state, thereby generating the CLR_PAR signal.

In state S4 a 128-bit counter is started, and the signal RCV_PACKET is asserted. This allows data to flow through into the Serial I/O register 54 for subsequent processing as described above. After a count of 128 the Serial Clear State Machine 62a advances to state S5 and then to state S6. In S5 the counter is cleared and then begins counting again. The State Machine 62a waits in S7 for another 128 cycles to occur with the RCV_PACKET signal de-asserted. State S7 clears the parity registers (R0–R3), propagates zeros through the Serial I/O register 54, and allows enough time for the previous packet to be clocked out of the Serial I/O register 54.

This technique ensures that the parity registers are cleared in-between packets, so that they correctly check for parity), and also eliminate any "stray" bits occuring on the serial bus.

Once a valid START field is detected and the remainder of the packet is clocked into the Serial I/O Register 54, the recipient PBIF 22e accepts the packet if (a) it is not already busy and (b) if it detects a valid START field, a set FULL flag, its own ID in the DESTINATION field (or a set broadcast bit), no NAK bit, and a correct LRC code. In order not to interrupt or pause the operation of the serial bus 40, the packet is clocked into the Serial Input Register 56 where the data is held for subsequent interpretation and processing, without affecting the operation of the serial bus 40. The Serial I/O Register 54 and the Serial Input Register 56 are skewed relative to each other by one bit, to allow a full cycle for decoding.

The combination of the serial packet pre-filter 62 and the LRC parity detector and generator 64 ensures a high probability that packets are not falsely decoded. That is, any packet that reaches the Serial I/O Register 54, but is detected as having bad parity, even if the packet is destined for another processor 22a, has the parity error flagged. Parity is generated again for all outgoing packets, even if destined for another processor. That is, the packet LRC parity is also corrected by the LRC parity detector and generator 64, which regenerates the LRC parity for each packet that passes through the PBIF 22e.

To guard against the small probability that a packet having a corrupted DESTINATION field will have its parity corrected and thereafter be accepted by the wrong processor node for execution, in addition to setting the ACK field of any packet which is serviced, the servicing PBIF 22e also stores the ID into the SOURCE field and stores the sender's ID into the DESTINATION field. In this way the sender may confirm, if required, that a packet was executed by the intended processor.

In order to eliminate any ambiguity as to the start of a serial packet, a counter 66 counts to 128 whenever the start of a valid serial packet is found, even if the packet is destined for another processor node. While the counter 66 is active, no START field can be sensed. Thus, it is unlikely that a "false" START indication would cause any action, as the false START would need to be coincident with correct FULL, ACK, NAK, DESTINATION and LRC indicators. If a valid packet were to be preceded closely by four random bits, which are decoded as a valid START signal, the packet may be ignored as it circulates through the serial bus 40. However, for this case the sender would note that the ACK field of the returned packet is not set, and would simply retransmit the packet.

Figure 7:
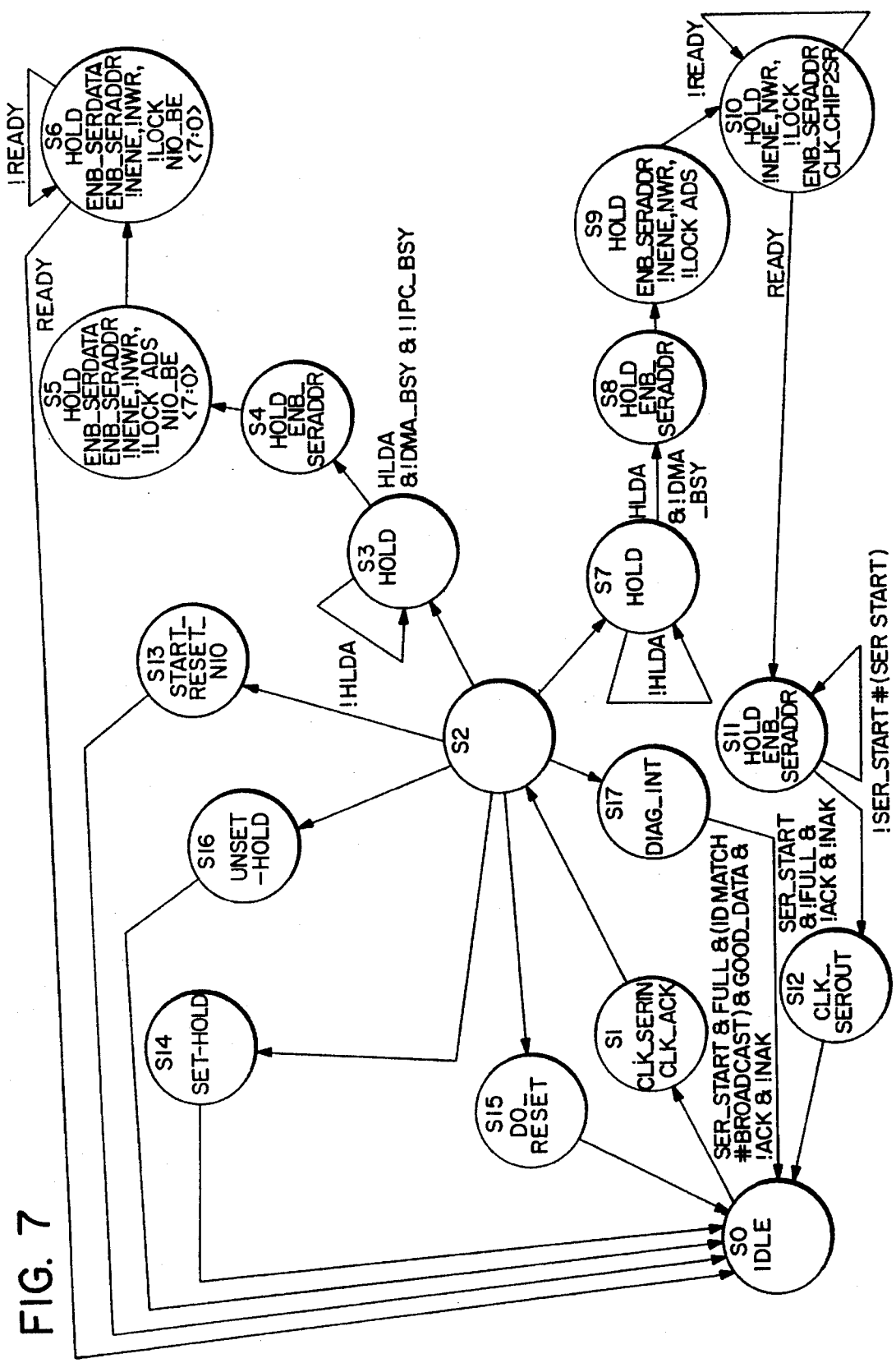
FIG. 7 shows a diagram of a Serial Diagnostic Bus State Machine.

Referring now to the Serial State Machine diagram of FIG. 7 a further description of the operation of the serial diagnostic interface is provided.

From the idle state S0, if a serial_start is decoded, a full bit is set, NAK is inactive, data parity is good, and either the broadcast bit is set, or an ID_MATCH is generated indicating that the destination field in the serial packet matches the recipient's identification, a branch is taken to state S1. In state S1, the data from the Serial I/O register 54 is clocked into the Serial Input register 56, using the clock enable CLK_SERIN. As was previously noted, the Serial I/O register 54 and the Serial Input register 56 are skewed by one bit, so that no data is lost when it is clocked down. The ACK bit in the original serial packet is set active to indicate reception of the packet.

From state S1 a branch is taken to state S2, and at the end of S2 a branch is made according to the state of the opcode which is now latched in the Serial Input register 56. If the opcode indicates either a node write or a broadcast write, a branch is taken to state S3. In this state, HOLD is indicated to the local processor 22a or 28a. The state machine loops in state S3 until a HLDA is received from the processor, indicating that it has placed its buses in a high impedance state.

A branch is then taken to state S4, where another cycle is executed to allow the processor buses to become fully disabled. However, the address is driven from the serial bus at this time in order to prevent the address bus from becoming undefined. From S4 state S5 is entered where the data from the Serial Input register 56 is enabled onto the processor node data bus. The address from the Serial Input register 56 is enabled onto processor node address bus. At the same time, processor node control signals are generated which initiate a write cycle to the address being driven to the processor node address bus. In addition, all of the processor node byte enables are driven low, so that all bytes are written. In state S6, all outputs continue to be active, with the exception of Address Strobe (ADS), which is now deasserted. The Serial Bus Controller 58 loops in state S6 until whichever PBIF 22e state machine which had been controlling the write (local, global or CSR) signifies completion by asserting READY. On READY a branch is taken back to the idle state S0.

If at state S2 the opcode indicates a node read request, a branch is taken to state S7, where HOLD is asserted to the local processor 22a or 28a. The Controller 58 state machine loops in state S7 until a HLDA is received from the local processor. In state S8, the serial address drivers are enabled and in S9 the address from the Serial Input Register 56 is driven onto the local processor node address lines, and processor node control signal lines are driven to indicate a read request. All outputs with the exception of ADS are active in state S10, and in addition a clock enable CLK_CHIP2SR is active, so that data will be latched from the processor node data bus into the Serial Output Register 60 at the end of every cycle.

When READY is received, indicating that the returned data is valid on the processor node data lines, a branch is made to S11, where no further latching of data takes place in that the correct data is now latched in the Serial Output register 60. The serial address is still driven active in state S11. In state S11 a wait is made for a start of packet indication conditioned on the full bit not being set. When a start of packet is sensed with the packet being indicated as empty a branch is made to state S12, where the clock enable CLK_SEROUT is valid. At the end of this state, data is latched down from the Serial Output Register 60 into the Serial I/O register 54. As was previously noted, these two registers are skewed by one bit to assure that correctly aligned data is latched down. Not all fields need to be latched down into the Serial I/O register 54. Specifically, the data field is latched, and 0000 is latched into the opcode field, indicating a data return. The address is a don't care field, and ACK and NAK are left as is. A PBIF 22e hardware ID is latched into the source field, and the requester's source ID is latched into the destination field. This latter field was originally latched when CLK_SERIN was active. Finally, a "1" is latched into the full bit.

If the opcode at state S2 indicates a node or broadcast reboot processor command a branch is taken to state S13. A signal line START_RESET is generated, which is an input to a PBIF 22e reset state machine. This causes a reset of the local processor 22a or 28a, but not a reset of the PBIF 22e. A branch is then made back to the idle state (SO).

If the opcode at state S2 indicates a node or broadcast halt a branch is taken to state S14, where a signal SET_HOLD is asserted. This sets the output of a register (not shown) which asserts a HOLD to the local processor 22a or 28a until reset. In the meantime, other serial diagnostic bus operations may take place.

If the opcode at state S2 indicates a node or broadcast unhalt a branch is taken to state S16 where a signal unset_ hold resets the register which was asserting HOLD to the local processor.

If the opcode at state S2 indicates an interrupt a branch is taken to state S17, where a signal —DIAG_INT is asserted for one cycle before returning to the idle state (S0). This enables the ability to selectively (or in broadcast mode) interrupt one or all of the system processors 22a and/or 28a.

If the opcode at state S2 indicates that a node or global reset should be performed a branch is taken to state S15 where the chip RESET line is pulsed active, clearing all PBIF 22e internal registers and state machines, and resetting the attached local processor. It should be noted however that the Serial Bus Controller 60 serial bus state machine is not reset, nor or any of the serial I/O registers. Serial data passes through the PBIF 22e unmodified during this reset.

Although described thus far in the context of a system wherein the SDI master 42 allows only one packet on the SDI bus 40 at any one time, the serial bus protocol of the invention allows an unlimited number of packets on the serial bus 40 at any given time, so long as the bus latency is longer than the total packet length. Thus, if it requires 512 clocks for the 128-bit packet to pass once around the SDI chain, then four packets (512/128) may be on the SDI serial bus 40 at one time. One requirement for multiple packet transmission is that a SDI Master 42 may have only one outstanding READ WORD function packet at any one time. This is to ensure that requested data is returned in the same order in which it was requested. Of course, the SOURCE and DESTINATION fields always indicate to which request a returned data packet belongs.

Also, although described thus far in the context of a system wherein there is but one SDI master 42, the simultaneous provision of multiple SDI Masters is also within the scope of the invention. For the multiple SDI Master embodiment the READ WORD function is implemented in such a manner that a processor 22a responding to a READ WORD function read request from SDI Master X waits until an empty packet arrives from SOURCE field=X, and ignores an empty packet arriving from, by example, SDI Master Y, which may be reading data from another processor node. The exchange of the SOURCE and DESTINATION fields, at least on returned READ WORD packets, enables each SDI Master to identify their respective returned read packets.

Thus, while the invention has been particularly shown and described with respect to a preferred embodiment thereof, it will be understood by those skilled in the art that changes in form and details may be made therein without departing from the scope and spirit of the invention.

What is claimed is:

1. A multiprocessor system having a plurality of processor nodes each of which includes a local data processor having a plurality of external control signal lines, external data signal lines, and external address signal lines which couple said local data processor to a plurality of components disposed external to said local data processor, said multiprocessor system including diagnostic and control circuitry comprising:

a bit serial communications bus having an input and an output, said plurality of processor nodes being serially coupled along said bit serial communications bus; and interface means comprising a first port for receiving a function code, a second port for coupling to said input of said bit serial communications bus, and a third port for coupling to said output of said bit serial communications bus, said interface means further comprising a formatting means having an input coupled to said first port and an output coupled to said second port, said formatting means being responsive to a reception of a function code from said first port for outputting the received function code as a corresponding packet to said second port;

wherein said diagnostic and control circuitry is further comprised of, in each of said plurality of processor nodes, nodal control means having an input coupled to a local nodal termination of said bit serial communications bus for receiving a packet therefrom and an output coupled to a local nodal origination of said bit serial communications bus for transmitting the packet thereto for reception by a next processor node or, for a last processor node coupled along said bit serial communications bus, for transmitting the packet to said bit serial communications bus for reception by said third port of said interface means, wherein said nodal control means is coupled to said local data processor and is responsive to a reception of a packet corresponding to a predetermined function for signalling said local data processor to terminate operation and, in response to said local data processor terminating operation, for controlling said local data processor external control signal lines, address signal lines and, if required, said local data processor data signal lines so as to execute the predetermined function in cooperation with said plurality of components disposed external to said local data processor.

2. A multiprocessor system as set forth in claim 1 wherein said nodal control means is responsive to the packet for controlling said local data processor external control signal lines and said external address signal lines to read data from an address location that is specified by said packet.

3. A multiprocessor system as set forth in claim 1 wherein said nodal control means is responsive to the packet for controlling said local data processor external control signal lines, data signal lines, and address signal lines to write data to an address location that is Specified by said packet.

4. A multiprocessor system as set forth in claim 1 wherein said formatting means includes means, responsive to a received function code, for generating a packet that is comprised of a plurality of bits partitioned into a plurality of fields, the fields including:

a DATA field for expressing data to be written to or data read from a specified address location;

an ADDRESS field for specifying the address location;

a SOURCE field for specifying an identification of a sender of the packet;

a DESTINATION field for specifying an identification of an intended recipient of the packet; and an OPCODE field for specifying the function to be performed by the recipient of the packet.

5. A multiprocessor system as set forth in claim 4 wherein said generating means is further responsive to a received function code for generating the packet to also include:

a START field for identifying the beginning of the packet;

a FULL flag which is set to indicate that the packet contains valid data in at least one field;

a LRC data integrity field for indicating the data integrity of the packet;

an ACK flag which is set to indicate that a processor node has received the packet; and a NAK flag which is set to indicate that a processor node has received the packet but is not able to accept the packet for execution.

6. A multiprocessor system as set forth in claim 4 wherein said generating means is further responsive to a received function code for generating the packet to further include information for identifying the packet as one addressed to a single recipient, or as a packet addressed to a plurality of recipients.

7. A multiprocessor system as set forth in claim 1 wherein said nodal control means of each of said plurality of processor nodes is further comprised of:

first register means having a serial input terminal coupled to said local nodal termination for inputting a packet from said bit serial communications bus in a bit serial format, said first register means further having a serial output terminal coupled to said local nodal origination for outputting a packet to said bit serial communications bus in a bit serial format;

second register means, having inputs coupled in parallel to parallel outputs of the first register means, for storing the packet after said first register means inputs the packet; and third register means, having inputs coupled in parallel to said external data signal lines, for storing data appearing on said external data signal lines, the third register means further having outputs coupled in parallel to parallel inputs of said first register means for transferring the stored data to a predetermined data portion of a packet stored within said first register means.

8. A multiprocessor system as set forth in claim 7 wherein said nodal control means of each of said plurality Of processor nodes is further comprised of:

communication bus filter means, interposed between the serial input terminal of said first register means and said local nodal termination of said bit serial communications bus, for filtering out received bits that do not correspond to a predetermined sequence of bits that indicate a start of a packet.

9. A multiprocessor system as set forth in claim 1 wherein said interface means is further comprised of:

a request register having an input coupled to said first port for receiving a function code therefrom, said request register further having a parallel output;

a serial I/O register having a parallel input coupled to said parallel output of said request register for receiving the function code from said request register, said serial I/O register further having a parallel output, a serial input terminal coupled to said third port for receiving a packet therefrom, and a serial output terminal coupled to said second port for providing a packet thereto; and a response register having a parallel input coupled to said parallel output of said serial I/O register for receiving information therefrom, said response register further having a parallel output coupled to said first port for providing the received information thereto.

10. A multiprocessor system as set forth in claim 1 wherein said bit serial communications bus is comprised of a single conductor.

11. A multiprocessor system as set forth in claim 1 wherein a packet includes information related to a data integrity of the packet, and wherein said nodal control means of each of said plurality of processor nodes includes means, coupled to the bit serial communication bus, for verifying and regenerating the integrity information for each received packet.

12. A multiprocessor system having a plurality of processor nodes each of which includes a local data processor having a plurality of external control signal lines, external data signal lines, and external address signal lines which couple said local data processor to a plurality of components disposed external to said local data processor, said multiprocessor system including diagnostic and control circuitry comprising:

a bit serial communications bus having an input and an output, said plurality of processor nodes being serially coupled along said bit serial communications bus; and interface means comprising a first port for receiving a function code, a second port for coupling to said input of said bit serial communications bus, and a third port for coupling to said output of said bit serial communications bus, said interface means further comprising a formatting means having an input coupled to said first port and an output coupled to said second port, said formatting means being responsive to a reception of a function code from said first port for outputting the received function code as a corresponding packet to said second port;

wherein said diagnostic and control circuitry is further comprised of, in each of said plurality of processor nodes, nodal control means having an input coupled to a local nodal termination of said bit serial communications bus for receiving a packet therefrom and an output coupled to a local nodal origination of said bit serial communications bus for transmitting the packet thereto for reception by a next processor node or, for a last processor node coupled along said bit serial communications bus, for transmitting the packet to said bit serial communications bus for reception by said third port of said interface means, wherein said nodal control means is coupled to said local data processor and is responsive to a reception of a packet corresponding to a predetermined function for generating an interrupt signal to said local data processor.

13. A multiprocessor system having a plurality of processor nodes each of which includes a local data processor having a plurality of external control signal lines, external data signal lines, and external address signal lines which couple said local data processor to a plurality of components disposed external to said local data processor, said multiprocessor system including diagnostic and control circuitry comprising:

a bit serial communications bus having an input and an output, said plurality of processor nodes being serially coupled along said bit serial communications bus;

interface means comprising a first port for receiving a function code specifying an action to be performed within one or more of said plurality of processor nodes, a second port for coupling to said input of said bit serial communications bus, and a third port for coupling to said output of said bit serial communications bus, said interface means further comprising a formatting means having an input coupled to said first port and an output coupled to said second port, said formatting means being responsive to a reception of a function code from said first port for outputting the received function code as a corresponding packet to said second port;

nodal control means, disposed in each of said plurality of processor nodes, having an input coupled to a local nodal termination of said bit serial communications bus for receiving a packet therefrom and an output coupled to a local nodal origination of said bit serial communications bus for transmitting the packet thereto for reception by a next processor node or, for a last processor node coupled along said bit serial communications bus, for transmitting the packet to said bit serial communications bus for reception by said third port of said interface means, wherein said nodal control means is coupled to said local data processor and is responsive to a reception of a packet corresponding to a predetermined function code for signalling said local data processor to terminate operation and, in response to said local data processor terminating operation, for controlling said local data processor external control signal lines, address signal lines and, if required, said local data processor data signal lines so as to execute the predetermined function in cooperation with said plurality of components disposed external to said local data processor, and wherein said nodal control means of each of said plurality of processor nodes is further comprised of, first register means having a serial input terminal coupled to said local nodal termination for inputting a packet from said bit serial communications bus in a bit serial format, said first register means further having a serial output terminal coupled to said local nodal origination for outputting a packet to said bit serial communications bus in a bit serial format;

second register means, having inputs coupled in parallel to parallel outputs of the first register means, for storing the packet after said first register means inputs the packet, said second register means having a first plurality of parallel outputs for coupling a first predetermined portion of said stored packet to said external data signal lines of said processor node, said second register means further having a second plurality of parallel outputs for coupling a second predetermined portion of said stored packet to said external address signal lines of said processor node;

third register means, having a plurality of inputs coupled in parallel to said external data signal lines, for storing data appearing on said external data signal lines, the third register means further having outputs coupled in parallel to parallel inputs of said first register means for transferring the stored data to said first predetermined portion of a packet stored within said first register means; and decoder means having inputs coupled to a third predetermined portion of a packet stored within said first register means for decoding function code associated information from said packet, said decoder means having outputs coupled to said external control signal lines for driving the external control signal lines in accordance with the decoded function code information.

14. A multiprocessor system as set forth in claim 13 wherein said decoder means is responsive to the third predetermined portion of said stored packet for controlling said local data processor external control signal lines so as to read data from an address location that is specified by said second plurality of parallel outputs of said second register means, and to subsequently couple the read data to said first predetermined portion of a stored packet though said plurality of inputs of said third register means.

15. A multiprocessor system as set forth in claim 13 wherein said decoder means is responsive to the third predetermined portion of said stored packet for controlling said local data processor external control signal lines so as to write data to an address location that is specified by said second plurality of parallel outputs of said second register means, the data to be written being output from said first plurality of parallel outputs of said second register means.

* * * * *

UNITED STATES PATENT AND TRADEMARK OFFICE
CERTIFICATE OF CORRECTION

PATENT NO. : 5,469,542

DATED : November 21, 1995

INVENTOR(S) : Foster et al.

It is certified that error appears in the above-identified patent and that said Letters Patent is hereby corrected as shown below:

In claim 1, col. 14, line 13, the word "the" should be deleted and --a-- inserted in its place.

In claim 1, col. 14, line 16, the word "the" should be deleted and --a-- inserted in its place.

In claim 2, col. 14, line 31, the word "the" should be deleted and --a received-- inserted in its place.

In claim 2, col. 14, line 34, after the word "said" insert --received--.

In claim 3, col. 14, line 36 the word "the" should be deleted and --a received-- inserted in its place.

In claim 3, col. 14, line 39, after the word "said" insert --received--.

In claim 4, col. 14, line 45, the word "expressing" should be deleted and --containing-- inserted in its place.

In claim 4, col. 14, line 54, after the word "the" insert --intended--.

In claim 5, col. 14, line 57, the word "the" should be deleted and --a-- inserted in its place.

In claim 6, col. 15, line 5, the word "one" should be deleted and --a packet that is-- inserted in its place.

In claim 6, col. 15, line 6, after the word "packet" insert --that is--.

In claim 12, col. 16, line 27, the word "the" should be deleted and --a-- inserted in its place.

In claim 12, col. 16, line 30, the word "the" should be deleted and --a-- inserted in its place.

In claim 12, col. 16, line 36, after the word "processor" and before the "." (the period), insert --and, responsive to said local data processor responding to the interrupt signal, for assuming control of said plurality of external control signal lines, external data signal lines, and external address signal lines for executing said predetermined function--.

In claim 13, col. 16, line 66, the word "the" should be deleted and --a-- inserted in its place.

UNITED STATES PATENT AND TRADEMARK OFFICE
CERTIFICATE OF CORRECTION

PATENT NO. : 5,469,542
DATED : November 21, 1995
INVENTOR(S) : David J. Foster, et al.

It is certified that error appears in the above-indentified patent and that said Letters Patent is hereby corrected as shown below:

In claim 13, col. 17, line 2, the word "the" should be deleted and --a-- inserted in its place.

Signed and Sealed this

Twenty-sixth Day of March, 1996

Attest:

BRUCE LEHMAN

Attesting Officer    Commissioner of Patents and Trademarks